United States Patent [19]
Morris

[11] 4,033,036
[45] July 5, 1977

[54] MORRIS POLE TYPE PRUNER

[76] Inventor: Charles F. Morris, P.O. Box 223, Tenino, Wash. 98589

[22] Filed: Aug. 18, 1976

[21] Appl. No.: 715,547

[52] U.S. Cl. .................................. 30/144; 30/249
[51] Int. Cl.² ...................................... B26B 13/22
[58] Field of Search ............. 30/123, 144, 249, 258

[56] References Cited
UNITED STATES PATENTS

| | | | |
|---|---|---|---|
| 459,989 | 9/1891 | Bosch | 30/144 X |
| 1,179,595 | 4/1916 | Wood | 30/144 |
| 1,246,685 | 11/1917 | Unruh | 30/249 |
| 3,360,858 | 1/1968 | Cowley | 30/249 |

Primary Examiner—Gary L. Smith
Assistant Examiner—J. C. Peters

[57] ABSTRACT

A pole type pruner with an enclosed blade type construction whereby the blade is supported from the sides thru the whole cutting cycle so a thinner blade can be used for easier cutting and less distortion to the wood and bark. This distortion is further reduced by a more choke type, more confining type cutting method, and because regardless of tree limb direction or position the cutting angle of the blade can be directed nearly perpendicular to the limb due to the use of a pole section angle changing box. A pruning saw, one end pivoted to the end of the cutter blade handle, sheathed when desired, being used as part of the cutter blade pull system makes the saw always conveniently available to be pivoted to proper angle of saw direction and clamped to the cutter blade in this position for saw pruning and yet eliminates an awkward outward projection when it's not used for saw pruning. The twist type of blade return coil spring used also reduces any awkward projection. A steel cable removably hooked to the other end of the pruning saw and confined always in near proximity alignment to the pole sections and pulled by the inherent leverage of a windlass as part of and attached to a bottom pole section creates a power and ease of blade pull and cutting really beneficial to tree pruning.

5 Claims, 3 Drawing Figures

U.S. Patent   July 5, 1977   4,033,036
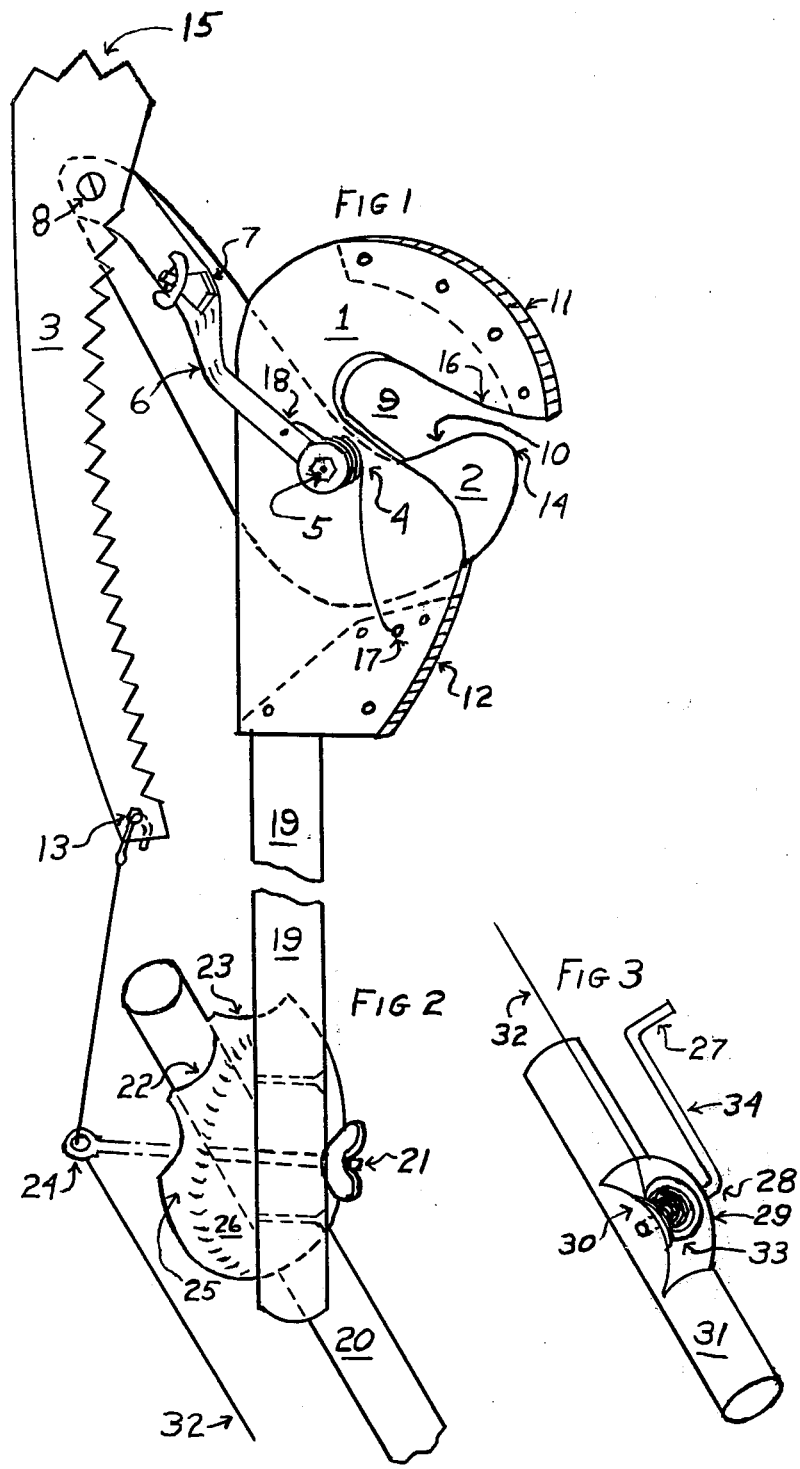

MORRIS POLE TYPE PRUNER

SUMMARY OF THE INVENTION

There has been a need for an improved pole type pruner, firstly whereby pruning tree limbs would be less tedious and more effectively accomplished with less wood and bark distortion and secondly to facilitate a convenient and ready pruner saw without continuous awkward outward projection. This invented pruner has served this need very well as the model has proven. The use of a thiner cutter blade is made possible by supporting it from the sides thru the whole cut cycle. A more correctly perpendicular cut to every limb is made possible by an angle changing pole joining box. More convenient and greater cutter blade pulling power is derived from incorporation of windlass leverage associated with steel cable and its proper restriction of allignment with the pole sections. A pruner saw is made convenient for saw pruning, without any outward projection when it is not being used for sawing, by being incorporated into the blade pull mechanism.

BRIEF DESCRIPTION OF THE DRAWINGS

Since the pole sections are relatively long and can be varied in length they are shown cut off as indicated.

FIG. 1 is a perspective side view of the pruner head and assembly in position whereby the saw is being used as part of the blade pull mechanism, pivoted downwards from sawing position, and the pruner blade is in mid closing cycle position from where it must pivot turn and a little more counter clockwise to start cut and from where it pivot turns clockwise for full open position.

FIG. 2 is a perspective view of the pole section joining angle changing box showing the pole sections in a clamped rigid position approximately 150 degrees with respect to each other and the pruner tilted sidewards by its respective pole section to a position of blade cut of about 150 degrees, which would be in respect to ground should the other joined pole section be held perpendicular to said ground. This view also shows the cable guide eye of the pivot pin end, which is positioned tight against the outward side of the lower pole section, but shown extended outwardly to make it more visible in the drawing.

FIG. 3 is a perspective view of the windlass assembly incorporated as leverage for pulling the cable which is the power source for the pruner blade cutting, and shows it as an integral part of one of the lower pole sections.

DETAILED DESCRIPTION

This pole type pruner incorporates many unique ideas and advantageous features not found in previous pruners. As shown in FIG. 1 the housing or side plates 1 are two duplicate shaped flat type metal sheets of a very modified right triangle shape with the sharpest angle or angle furthest from the right angle shortened or cut to a perpendicular to the side opposite the hypotenuse and the right angle and remaining angle rounded off. These side plates have near the bottom of their top and widest half a U shaped notch or cut out 9 extending inwards and somewhat upwards in an oblique angle to the hypotenuse and from the opened end of the notch to a depth of about 3 inches or distance equal to a little more than twice the diameter of the limb size to be cut. The notch is just wide enough to accommodate this limb size, and when blade 2 is returned to open position and extreme clockwise pivoted position by the spring 4 it allows an open end notch opening of said limb size, thereby limiting entry to a size which can be properly circled and pruned or cut off. Sharpened inner edge 10 of cutter blade 2 cuts the limb in a hook type motion directed toward the back of the U shaped notch 9 and toward the pruner pole section. It is forced to make this type cutting motion by being pivoted counter clockwise on its pivot pin 5 by cable pull at one end 13 of the pruner saw 3 and thru the pruner saw to its pivot pin 8 which is inserted near the other end and near the cutting edge of the saw and thru the handle portion of the pruner blade 2 near its outer end.

The pruner blade 2 is a rounded hockey club shape with a pivot pin 5 inserted thru it near the vertex of its inside cutting portion and inside handle portion or the vertex of the inside blade angle sides. Said pivot pin 5 also goes thru a hole just below the inside round of U shaped indention 9 of each side plate 1, and extends outwards from one side plate to a distance sufficient to contain a strong spiral type coil spring 4 which is held torque tension so as to always pivot the pruner blade to an extreme clockwise position whenever cable pull is released. One end of this spring is fixed to a side plate at 17 and the other end is fixed to a pivot pin to blade support bar 6 at 18. This support bar 6 also helps contain the spring 4 to pin 5 and serves as a spacer between saw 3 and blade 2 to prevent contact dulling of saw teeth. Fixed thru support bar 6 and thru the blade handle portion is a winged nut type clamping tab or lug 7 which fits into notches 15 on the saw end and slightly overlaps onto the notch sides when the saw 3 is unhooked from the cable at 13 and is pivoted at pin 8 to an outward extended position for saw pruning, and the tab 7 is rotated to the appropiate position to fit into the notch required for the desired angle of extension. When tightened down by the wing nut tab 7 clamps the saw end tightly to the pruner blade handle portion. Since the upper spacer 11 restricts completely the clockwise direction of blade pivot and spring 4 tension holds it in this extreme clockwise position with sufficient restraint the saw is held extended out ward in a proper pruning position. Practically all the pressure against the saw is upward and outward since the saw cuts when being pulled and thereby against spacer 11 and not against spring 4 tension. Spring 4 is heavy and stiff with great torque tension to properly return the blade to open position and with enough turns, six or seven, so it will not lose its tension due to its many approximate 150° angle blade pivot rotations.

Side plate spacers 11 and 12 are just sufficiently thick to create a space between the side plates just wide enough to allow free rotation movement of blade 2 on its pivot pin 5 and said spacers are positioned properly to allow said movement of approximately 150 degrees and yet hold the side plates rigidly against the sides of the cutting portion of the blade 2 during the whole cut cycle, with the help of pivot pin 5 which is designed to completely restrict side movement of a center portion of the side plates. Just prior to the limb being tightly circled and beginning of the cut, the end portion 14 of the cutter blade 2 enters between the side plates at 16 thereby restricting sideward movement of the cutter blade and perfect allignment for cutting. This unique feature plus previously stated sideward movement restriction of the blade makes it possible to use a thinner type blade and thereby less distortion of the wood and bark of the limb being cut.

To accommodate properly for best pruning, limbs which very seldom extend straight out perpendicular to a tree trunk, but often much more upward in direction than parallel to ground surface, this pruner incorporates a pole section joining angle changing box as shown in FIG. 2. This said box is made of heavy sheet metal round in shape with the outer edge cupped or folded up to a right angle rim 25. This rim should be at least three and one half inches in diameter and three fourths inch in height, so as to accommodate three pairs of cross center half round type notches of sufficient depth for stable hold and with enough metal surfacing remaining to stably support two pole sections at three different angles of more than 90° relative to each other. One pair of said cross center notches brings the two pole sections in allignment or near allignment with each other. The flat surface 26 of the angle changing box is fixed to one end of the pole section 19 to which on the other end is fixed the pruner, with relative position of direction being such that the pruner side plates 1 are perpendicular to the flat surface 26 of the angle changing box. Whereby changing the angle between pole section 19 and pole section 20 by rotating pole section 20 on pivot pin 21 from one pair 22 of cross center notches to another pair 23 moves the pruner sidewards in a tilt motion whereby the angle of cut by the pruner is changed in respect to pole section 20 and ground, and whereby limbs at any angle with respect to to ground can be pruned at the easiest and most suitable angle. The tilt pin 21 is inserted thru a hole in the center of the pole section angle changing box and thru a hole centered near the end of each pole section 19 and 20. Said pin is threaded on one end to accommodate a wing type nut for quick loosening and tightening when the pole section 20 is rotated from one pair of notches to the other, and has an eye 24 on the other end thru which the pull cable is confined to close allignment with the pole sections regardless of their angle to each other. This eye 24 is shown in FIG. 2 extended out, but is positioned tight against the outer side of pole 20. Close allignment of the cable to the pole sections creates very little side pull and bending force on the pole sections even with great pull on the cable.

Sufficient pull force on the cable to pivot the pruner blade on its pivot pin whereby it cuts thru a limb, is generated conveniently with little physical effort by a type of windlass mechanism incorporated into the pruner assemblage. This pull mechanism as shown in FIG. 3 consists of a round pulley 33 with a half round type of groove on its outer perimeter sufficient in depth and width to contain cable of a length equal to the combined length of the pole sections used. One end of this cable is fixed to the pulley 33 and the other end is attached to a hook which is inserted thru a hole in one end of a pruner saw as shown at 13 in FIG. 1 when the saw is used as part of the pull mechanism. When the saw is pivoted for saw pruning the hook is unhooked and restricted to eye 24 of FIG. 2. Crank 34 of FIG. 3 is made from a rodwith a shorter section on each end bent to approximately 90° and parallel to each other. One of these shorter sections 27 serves as a handle and the other section 28 becomes a shaft thru the center of the pulley 33 to which it is fixed and thru a hole in each of two side plates 29 and 30 which are formed by cutting and bending upward, portions of the bottom pole section 31. Pulley 33 being fixed to crank 34 is forced to rotate when the crank 34 is rotated creating a tremendous pull on cable 32 due to the inherent leverage of the windlass type mechanism.

I claim:

1. A pole type pruner comprising two duplicate flat sheet metal side plates, each of an overall basic right triangle shape but with one of the two angles to its hypotenuse rounded off and the other shortened by cutting the hypotenuse to a perpendicular to the longer opposite side, each side plate having at the bottom of its top widest half a U shaped notch or cut-out extending inwards and somewhat upwards in an oblique angle to the hypotenuse to a depth of about three inches or equivalent to a little more than twice the diameter of the maximum limb size to be cut and this notch just sufficient in width to accommodate this limb size; and a short appropiate distance below the inner rounded end of this U shaped notch in each side plate is a hole thru which a pin is installed as a pivot anchor point for the cutter blade; and these side plates are in fixed position parallel to each other and spaced a distance slightly more than the cutter blade thickness, with spacers so shaped and fixed between the sides in such position as to allow free movement of the blade in a pivot swing of about 150° and said side plates fixed sidewards at their straight back edge portion against a pole section.

2. The pruner of claim 1 having a blade of a rounded hockey club shape with a hole for the blade to side plates pivot pin near the inner vertex of the longer handle portion and the shorter cutter portion but thru the bottom of the handle portion and about a quarter of an inch from its inner edge, the inner edge of the shorter section being sharpened for cutting, and the longer portion having near its top and outward corner a hole thru which a saw end to cutter blade pivot pin is inserted whereby a pruning saw incorporated as part of the blade pull mechanism or pivoted to proper position and saw direction for saw pruning and fixed in this position of direction by a screw clamp attached to the cutter blade handle portion, the saw having a notch for this clamp and a hole at its opposite end to accommodate a hook attached to the blade pull cable.

3. The pruner of claim 2 with a twist type coil spring circling the extended end of the blade thru side plates pivot pin and restricted to this pins length by a pivot pin to blade support bar to which one end of the spring is fixed and the other spring end fixed to one side plate, and this spring being in such torque tension as to always return the blade to open pruner extreme clockwise pivoted position with release of cable pull.

4. The pruner of claim 3 with a pole section joining angle changing box to change pruner position and direction sidewards whereby the pruner blade cut angle is changed sidewards, round in shape of heavy sheet metal with the outer edge cupped or folded up to a right angle rim sufficient in height and circumference to provide metal surfacing enough to accommodate three across center pairs of half round type notches or cut-outs to hold and support with stability two pole sections at any one of three different angles more than 90° relative to each other, and this angle changing box being in fixed position at one end of the pole section to which at the other end is fixed the pruner and with a pivot pin thru its center and thru the center near the end of each joining pole section, and this bolt and wing nut type pivot pin having an eye at one end thru which the pruning blade pull cable is strung and confined to close proximity allignment with the pole sections.

5. The pruner of claim 3 with a pruner blade handle pull mechanism consisting of a round pulley having a half round cable holding type groove on its outer perimeter sufficient in depth and width to contain cable the length of the pole sections used and to which one end of the cable is attached, and this pulley fixed to the crank end pulley shaft section which goes thru its center and thru two pulley bracket sides formed from the pole section making a stable windlass type cable pull mechanism, the crank of which consists of a rod with a shorter section on each end bent to approximately 90 degrees and to parallel with each other, the said crank end pulley shaft section being one of these shorter sections and the other shorter section being used as a handle and the longer center section a lever for turning the pulley.

* * * * *